(12) United States Patent
Hong (10) Patent No.: US 10,879,725 B2
(45) Date of Patent: Dec. 29, 2020

(54) ELECTRONIC DEVICE, POWER SUPPLY DEVICE OF ELECTRONIC DEVICE, AND POWER SUPPLY METHOD

(71) Applicant: Samsung Electronics Co., Ltd., Gyeonggi-do (KR)

(72) Inventor: Sung Min Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 75 days.

(21) Appl. No.: 15/778,400

(22) PCT Filed: Nov. 25, 2016

(86) PCT No.: PCT/KR2016/013725
§ 371 (c)(1),
(2) Date: May 23, 2018

(87) PCT Pub. No.: WO2017/105001
PCT Pub. Date: Jun. 22, 2017

(65) Prior Publication Data
US 2018/0342885 A1 Nov. 29, 2018

(30) Foreign Application Priority Data

Dec. 17, 2015 (KR) .......................... 10-2015-0180937

(51) Int. Cl.
*H02J 7/34* (2006.01)
*H02J 7/00* (2006.01)
(Continued)

(52) U.S. Cl.
CPC ............. *H02J 7/342* (2020.01); *H01M 10/44* (2013.01); *H02J 1/10* (2013.01); *H02J 7/0031* (2013.01); *H02J 7/0068* (2013.01); *H02J 7/34* (2013.01)

(58) Field of Classification Search
CPC ...... H02J 7/0054; H02J 7/0068; H02J 7/0031; H02J 1/10; H02J 7/34; H02J 7/342; H01M 10/44

See application file for complete search history.

(56) References Cited

U.S. PATENT DOCUMENTS 5,717,307 A * 2/1998 Barkat ................. H01M 10/44
340/636.1
5,831,350 A * 11/1998 McConkey ............. G06F 1/263
307/150

(Continued)

FOREIGN PATENT DOCUMENTS

EP 0 779 571 6/1997
JP 2003164070 6/2003

(Continued)

OTHER PUBLICATIONS

European Search Report dated Jul. 25, 2018 issued in counterpart application No. 16875943.9-1202, 8 pages.

(Continued)

*Primary Examiner* — Drew A Dunn
*Assistant Examiner* — Sailesh Thapa
(74) *Attorney, Agent, or Firm* — The Farrell Law Firm, P.C.

(57) ABSTRACT

Various embodiments of the present disclosure relate to an electronic device including: a first battery for supplying power; an attachable/detachable power supply device including a second battery for supplying power and a DC power connector; and a processor connected to the first battery, and connected to the second battery and the DC power connector when connecting to the power supply device, wherein the power supply device includes at least two MOSFETs for connecting the second battery and an element, for detection of the power supply device, provided to the electronic device when connecting the power supply (Continued)

device. In addition, other examples, which can be identified through the specification, are possible.

8 Claims, 8 Drawing Sheets

(51) Int. Cl.
  *H02J 1/10* (2006.01)
  *H01M 10/44* (2006.01)

(56) References Cited

U.S. PATENT DOCUMENTS

| | | | |
|---|---|---|---|
| 6,031,353 | A | 2/2000 | Banyas et al. |
| 6,043,626 | A | 3/2000 | Snyder et al. |
| 6,160,381 | A | 12/2000 | Peterzell |
| 9,035,600 | B2 | 5/2015 | Park et al. |
| 9,152,012 | B2 | 10/2015 | Yamaguchi |
| 9,350,183 | B2 | 5/2016 | Park et al. |
| 10,020,665 | B2* | 7/2018 | Uan-Zo-Li .............. H02J 7/0054 |
| 2009/0265570 | A1* | 10/2009 | Chen ....................... H02J 7/342 713/340 |
| 2012/0161697 | A1 | 6/2012 | Park et al. |
| 2013/0272691 | A1 | 10/2013 | Yamaguchi |
| 2015/0236539 | A1 | 8/2015 | Park et al. |
| 2015/0303695 | A1* | 10/2015 | Perry .................... H02J 7/0013 307/80 |
| 2015/0340897 | A1 | 11/2015 | Uan-Zo-Li et al. |

FOREIGN PATENT DOCUMENTS

| | | |
|---|---|---|
| JP | 2013240267 | 11/2013 |
| KR | 1020050005926 | 1/2005 |
| KR | 1020120036046 | 4/2012 |
| KR | 101285609 | 7/2013 |
| KR | 1020150056739 | 5/2015 |
| WO | WO 99/07079 | 2/1999 |
| WO | WO 00-21179 | 4/2000 |

OTHER PUBLICATIONS

PCT/ISA/210 Search Report issued on PCT/KR2016/013725 (pp. 5).
PCT/ISA/237 Written Opinion issued on PCT/KR2016/013725 (pp. 4).
European Search Report dated Oct. 16, 2020 issued in counterpart application No. 16875943.9-1202, 7 pages.

* cited by examiner

| No. | DC-POWER | MAIN BATTERY | VGRIP BATTERY | USB TERMINAL | DESCRIPTIONS |
|---|---|---|---|---|---|
| 1 | O | X | X | X | DC-POWER: SUPPLY |
| 2 | O | X | O | X | DC-POWER: SUPPLY, VGRIP BAT: OFF |
| 3 | O | O | X | X | DC-POWER: SUPPLY, MAIN BAT: OFF |
| 4 | X | O | X | X | MAIN BAT: SUPPLY |
| 5 | X | X | O | X | VGRIP BAT: SUPPLY |
| 6 | X | O | O | X | VGRIP BAT: SUPPLY |
| 7 | O | X | X | O | DC-POWER: SUPPLY |
| 8 | X | O | X | O | CHARGE MODE |
| 9 | X | X | O | O | CHARGE MODE |

Columns 810: DC-POWER, MAIN BATTERY, VGRIP BATTERY, USB TERMINAL
Column 820: DESCRIPTIONS

FIG. 8

ELECTRONIC DEVICE, POWER SUPPLY DEVICE OF ELECTRONIC DEVICE, AND POWER SUPPLY METHOD

PRIORITY

This application is a National Phase Entry of PCT International Application No. PCT/KR2016/013725 which was filed on Nov. 25, 2016, and claims priority to Korean Patent Application No. 10-2015-0180937, which was filed on Dec. 17, 2015, the content of each of which is incorporated herein by reference.

TECHNICAL FIELD

Embodiments disclosed therein relate to an electronic device, a power supply device detachable from the electronic device, and a power supply method between the electronic device and the power supply device.

BACKGROUND ART

With developments of information and communication technology, network devices such as a base station and the like are installed throughout the country. The electronic device receives and transmits data from and to another electronic device through a network, and thus a user utilizes the network freely anywhere in the country.

According to the recent trend of the digital convergence, various kinds of electronic devices provide a variety of functions. For example, a smartphone supports Internet connection through the network as well as a call function. Furthermore, the smartphone supports a playback function of music or video and a capturing function of a photo or a moving picture using an image sensor.

A user carries the electronic device for performing various functions and thus power management has been an important issue.

DISCLOSURE

Technical Problem

Conventionally, when a power supply device is detached from the electronic device, even if a conductive member makes contact with a connector of the power supply device, the power supply device is shorted and then is broken.

Embodiments disclosed in the present disclosure are provided to solve the above problems and to accomplish objects suggested in the present disclosure. Embodiments disclosed in the present disclosure are to provide at least two MOSFETs between a battery and a connector of a power supply device to prevent the power supply device from being broken.

Technical Solution

According to one embodiment of the present disclosure, an electronic device may include a first battery to supply power; a power supply device being detachable and including a second battery to supply power and a DC power connector; and a processor connected with the first battery and connected with the second battery and the DC power connector in connection of the power supply device. The power supply device may include at least two MOSFETs connecting the second battery with a power supply device detecting element, which is provided in the electronic device, in the connection of the power supply device.

According to one embodiment of the present disclosure, a power supply device may include a battery to supply power; a DC power connector to supply DC power; and a connector to connect the battery or the DC power connector with an electronic device. The battery may include at least two MOSFETs connecting the battery with a power supply trigger device included in the electronic device.

Advantageous Effects

As described above, according to embodiments disclosed herein, the electronic device, the power supply device, and the method thereof according to the present disclosure may decide to effectively supply power to the electronic device between a plurality of batteries and DC power. In addition, according to various embodiments, when the power supply device is detached, the power supply device may be prevented from being broken by connecting MOSFETs to prevent the short of the power supply device even if the conductive member makes contact with the connector of the power supply device.

Besides, a variety of effects directly or indirectly understood through the present disclosure may be provided.

MODE FOR INVENTION

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features. In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element). According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSyne™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

Figure 1:
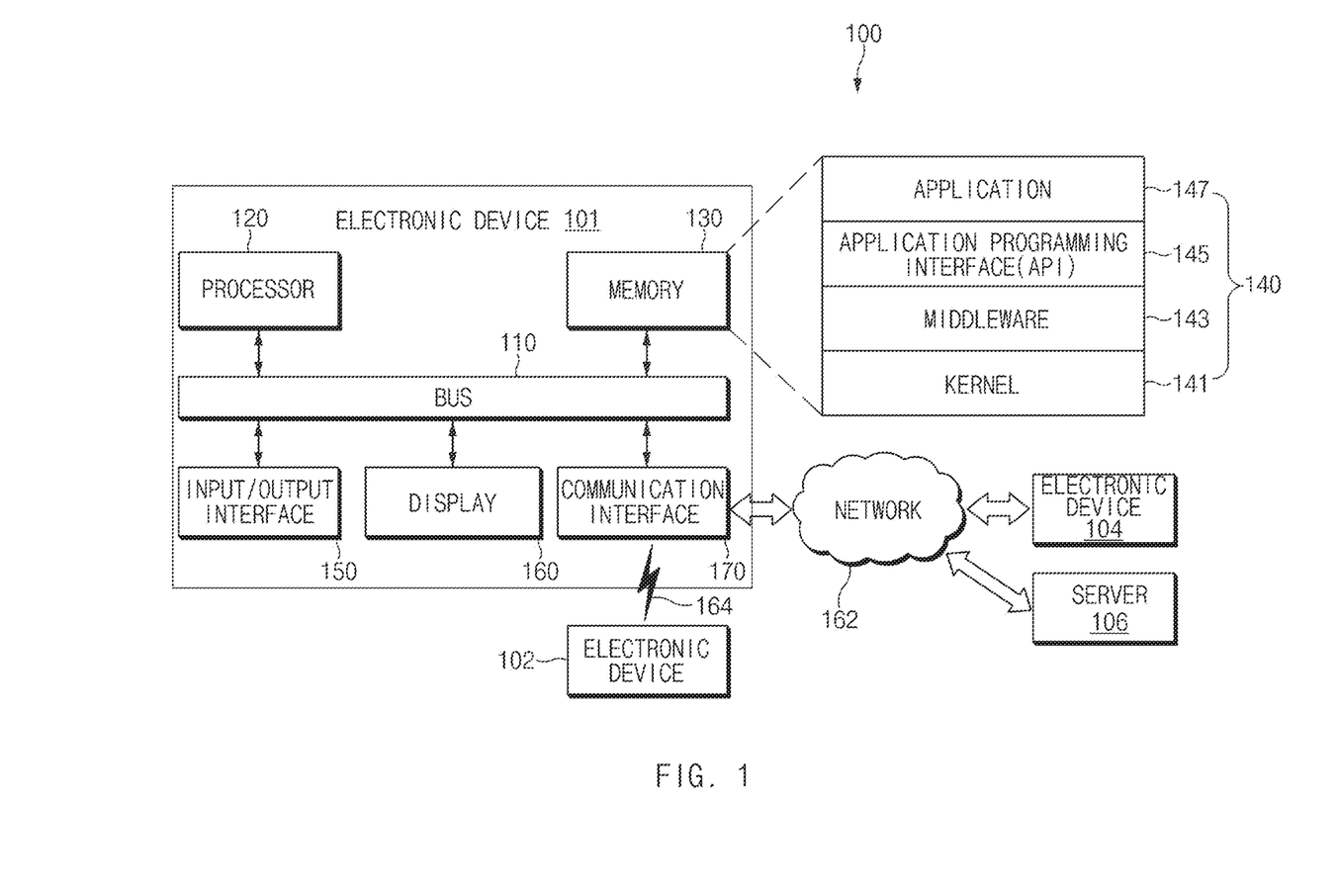
FIG. 1 illustrates an electronic device in a network environment according to various embodiments.

FIG. 1 illustrates an electronic device in a network environment system, according to various embodiments.

Referring to FIG. 1, according to various embodiments, an electronic device 101, a first electronic device 102, a second electronic device 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store commands or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other element(s) of the electronic device 101. Furthermore, the input/output interface 150 may output a command or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 164. The short range communication 164 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
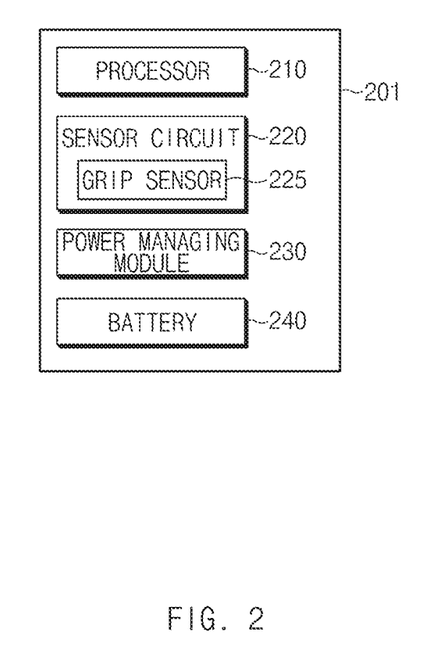
FIG. 2 illustrates a block diagram of the electronic device, according to various embodiments.

FIG. 2 illustrates a block diagram of the electronic device, according to various embodiments.

Referring to FIG. 2, an electronic device 201 may include, for example, all or some elements of the electronic device 101 illustrated in FIG. 1. The electronic device 201 may include one or more of processors 210 (e.g., an AP), a sensor circuit 220, a power managing module 230, and a battery 240.

The processor 210 may control, for example, a plurality of hardware or software elements connected to the processor 210 and perform various data processing and arithmetic operations by running an operating system (OS) or an application program. The processor 210 may be, for example, implemented with a System on Chip (SoC). According to an embodiment, the processor 210 may further include a graphic processing unit (GPU) and/or an image signal processor. The processor 210 may include at least a portion (e.g., the power managing module 230) of elements illustrated in FIG. 2. The processor 210 may load a command or data received from at least one of the remaining elements (e.g., a non-volatile memory) into a volatile memory and may process the command or the data. In addition, the processor 210 may store various data into the non-volatile memory.

The sensor circuit 220 may measure, for example, a physical quantity or may detect an operation state of the electronic device 201. The sensor circuit 220 may convert the measured or detected information to an electric signal. The sensor circuit 220 may include a grip sensor 225. The grip sensor 225 may sense, for example, whether the electronic device 201 is gripped by a user. The processor 210 may activate (e.g., power on) the electronic device 201 when the electronic device 201 receives the notification, from the grip sensor 225, that the electronic device 201 is gripped.

According to various embodiments of the present disclosure, the sensor circuit 220 may include, for example, at least one of a gesture sensor, a gyro sensor, a proximity sensor, a fingerprint sensor, a color sensor (e.g., an RGB sensor), an illuminance sensor or an ultra violet (UV) sensor.

The sensor circuit 220 may further include a control circuit for controlling at least one or more sensors included therein. According to an embodiment, the electronic device 201 may further include a processor, which is a part of the processor 210 or is independent of the processor 210, to control the sensor circuit 220 while the processor 210 is in a sleep state.

The power managing module 230 may manage, for example, the power of the electronic device 201. According to an embodiment, the power managing module 230 may include a power management integrated circuit (PMIC) a charger integrated circuit (IC), or a battery or fuel gauge. The PMIC may have a wired charging manner and/or a wireless charging manner. The wireless charging manner may include, for example, a magnetic resonance, magnetic induction, or electromagnetic manner and may further include an additional circuit, for example, a coil loop, a resonant circuit, or a rectifier for the wireless charging manner. The battery gauge may measure, for example, a remaining capacity of the battery 240 and a voltage, current or temperature thereof while the battery 240 is charged. The battery 240 may include, for example, a rechargeable battery or a solar battery.

Each of the above-mentioned elements described in the present disclosure may include one or more components, and the names of the elements may be varied depending on the types of electronic devices. In various embodiments, the electronic device may include at least one of the above-mentioned elements described in the present disclosure, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
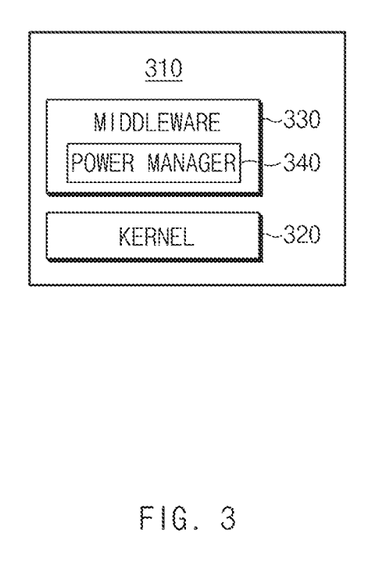
FIG. 3 illustrates a block diagram of a program module, according to various embodiments.

FIG. 3 illustrates a block diagram of a program module according to various embodiments.

According to an embodiment, a program module 310 (e.g., the program 140) may include an operating system (OS) to control resources associated with an electronic device (e.g., the electronic device 101), and/or various applications (e.g., the application program 147) run on the OS. The OS may be, for example, android, iOS, Windows, Symbian, Tizen, or Bada.

The program module 310 may include a kernel 320, a middleware 330, an API (not illustrated), and/or an application (not illustrated). At least a part of the program module 310 may be preloaded on an electronic device or may be downloadable from an external electronic device (e.g., the electronic device 102 or 104, the server 106, and the like).

The kernel 320 (e.g., a kernel 141) may include, for example, a system resource manager or a device driver. The system resource manager may perform control, allocation, or retrieval of system resources. According to an embodiment, the system resource manager may include a process managing unit, a memory managing unit, or a file system managing unit. The device driver may include, for example, a display driver, a camera driver, a Bluetooth driver, a common memory driver, a USB driver, a keypad driver, a Wi-Fi driver, an audio driver, or an inter-process communication (IPC) driver.

The middleware 330 may provide, for example, a function required by the application in common, or may provide various functions to the application through the API to allow the application to efficiently use limited system resources of the electronic device. According to an embodiment, the middleware 330 (e.g., middleware 143) may include a power manager 340. According to various embodiments of the present disclosure, the middleware 330 may further include, for example, at least one of a runtime library, an application manager, a window manager, a multimedia manager, a resource manager, a database manager, a package manager, a connectivity manager, a notification manager, a location manager, a graphic manager, a security manager, or a payment manager.

The power manager 340 may operate, for example, with a basic input/output system (BIOS) to manage a battery or power, and may provide power information for an operation of an electronic device.

The middleware 330 may include a middleware module which combines various functions of the above-described elements. The middleware 330 may provide a module specialized to each OS type to provide differentiated functions. In addition, the middleware 330 may remove some existing elements or add new elements, dynamically.

The API (e.g., the API 145) may be, for example, a set of API programming functions and may have various configurations depending on OSs. For example, when an OS is the android or the iOS, one API set may be provided for each platform. When an OS is the tizen, two or more API sets may be provided for each platform.

According to various embodiments, at least a part of the program module 310 may be implemented by software, firmware, hardware, or the combination of two or more thereof. At least a part of the program module 310 may be implemented (e.g., executed), for example, by the processor (e.g., the processor 210). At least a part of the program module 310 may include, for example, modules, programs, routines, sets of instructions, or processes, or the like for performing one or more functions.

Figure 4:
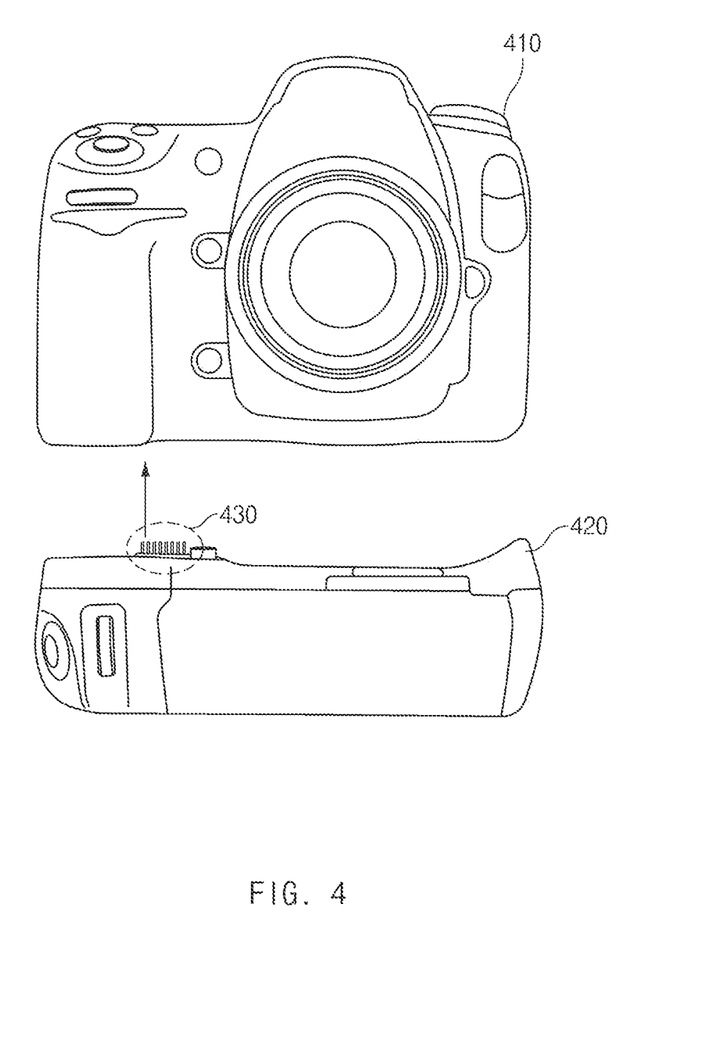
FIG. 4 is a view illustrating an electronic device and a power supply device, according to various embodiments of the present disclosure.

FIG. 4 is a view illustrating an electronic device and a power supply device, according to various embodiments of the present disclosure.

Referring to FIG. 4, an electronic device 410 and a power supply device 420 may be connected with each other through a connector 430 of the power supply device 420.

The above description has been made in that the electronic device includes a smartphone, a tablet personal computer (PC), a laptop PC, a camera, a home appliance, or various medical devices. The following description will be made with reference to FIG. 4 regarding that the electronic device 410 is a camera by way of example. However, the electronic device 410 is not limited to the camera.

The electronic device 410 may include a battery (hereinafter, referred to as "first battery") and may operate by using the first battery. In addition, the electronic device 410 may include a charging connector (e.g., a USB charging connector) for connecting a charging power source to a housing of the electronic device 410 and a charging circuit which charges the first battery with power supplied through the charging power source.

The power supply device 420 may include a battery (hereinafter, referred to as "second battery") and may supply power of the second battery to the electronic device 410 through the connector 430. In addition, the power supply device 420 may include a DC power connector for connecting a DC power source to a housing of the power supply device 420 and may supply the DC power, which is received from the DC power source, to the electronic device 410 through the connector 430.

The processor of the electronic device 410 may select any one of the first battery, the second battery, and the DC power source and may supply power from the selected power source to the electronic device 410.

In addition, the charging power source may be used for charging not only the first battery but also the second battery depending on settings.

When the power supply device 420 is detached from the electronic device 410, the connector 430 is exposed to the outside. Accordingly, a conductive object may make contact with the connector 430 to be electrically shorted or the power supply device 420 may be damaged when higher power is applied to the connector 430. Accordingly, the power supply device 420 may include an MOSFET between a DC power connector and the connector 430 to prevent the power supply device 420 from being damaged. The details thereof will be described with reference to FIGS. 5 and 6.

Figure 5:
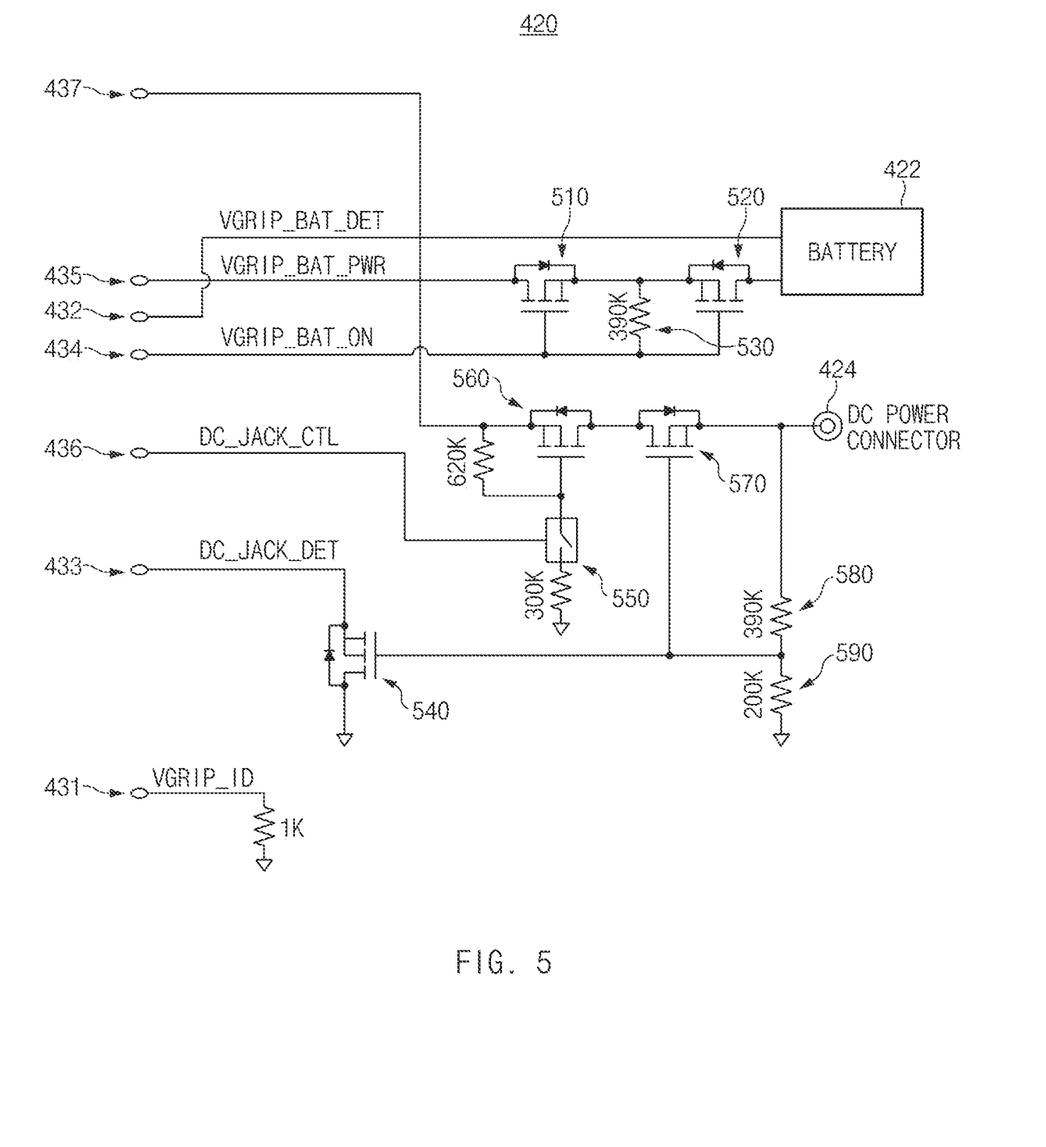
FIG. 5 is a circuit diagram of a power supply device, according to various embodiments of the present disclosure.

FIG. 5 is a circuit diagram of the power supply device, according to various embodiments of the present disclosure.

Referring to FIG. 5, first to seventh connection pins 431 to 437 are a plurality of pins of the connector 430 arranged when viewed from a plan view. The power supply device 420 may include the first connection pin 431 to the seventh connection pin 437, a battery 422 (second battery described with reference FIG. 4) and a DC power connector 424. Alternatively, the power supply device 420 may include at least one device (e.g., resistors 530, 580, and 590, MOSFETs 510, 520, 540, 560, and 570, and a switch 550) interposed between the battery 422 or the DC power connector 424 and the second to seventh connection pins 432 to 437.

The first connection pin 431, the second connection pin 432, and the third connection pin 433 may be used to determine whether the power supply device 420 is detached from the electronic device 410. The fourth connection pin 434 may be connected with an element (an element 660 of FIG. 6) of the electronic device 410 to turn on MOSFETs 510 and 520 such that power is transmitted from the battery 422 to the electronic device 410. The fifth connection pin 435 may be used as a passage for transmitting the power from the battery 422 to the electronic device 410. The sixth connection pin 436 may be used such that the electronic device 410 controls the power supply device 420 to supply DC power to the electronic device 410 when the DC power is supplied through the DC power connector 424. The seventh connection pin 437 may be used as a passage for transmitting the DC power to the electronic device 410.

Figure 6:
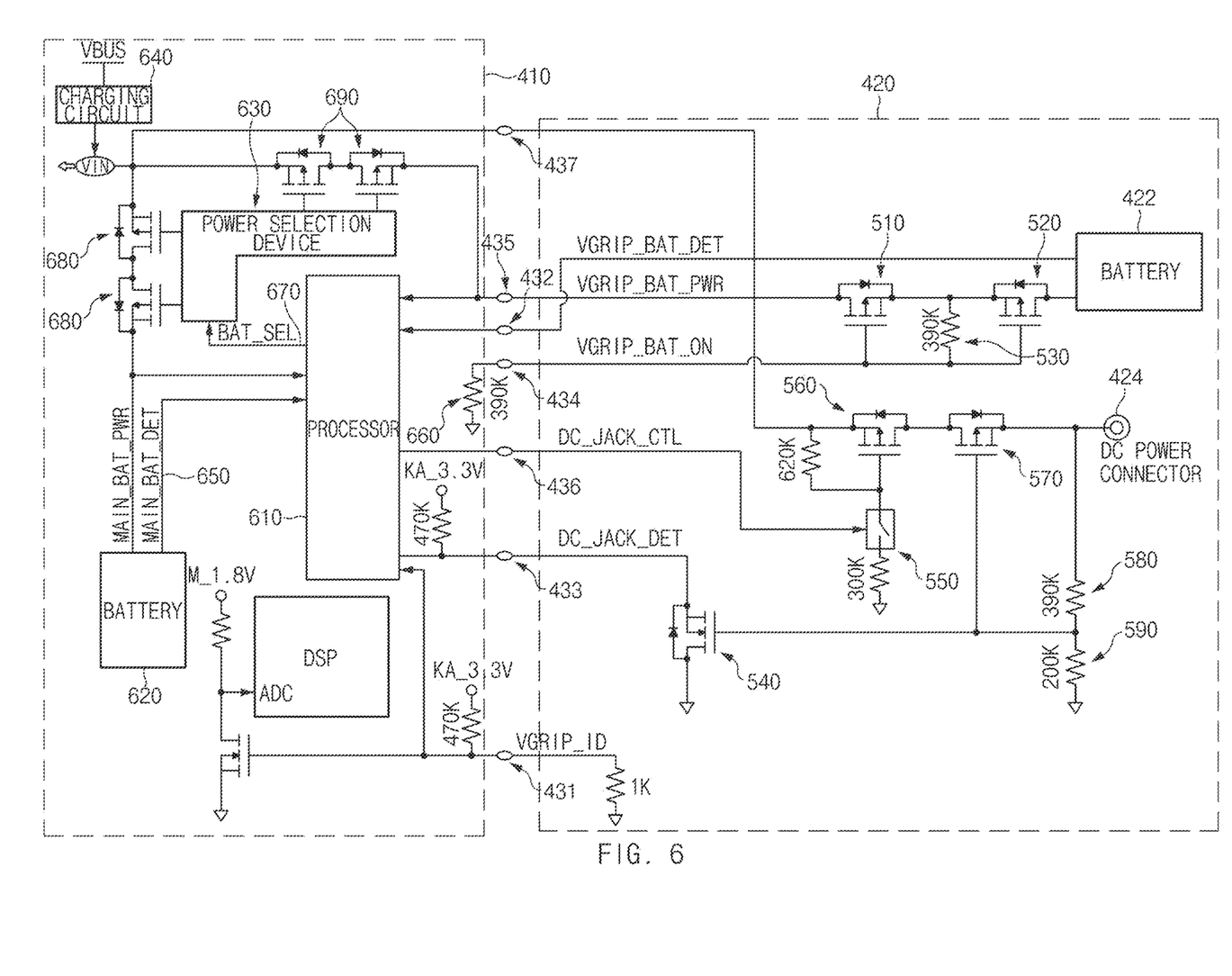
FIG. 6 is a circuit diagram of an electronic device and a power supply device, according to various embodiments of the present disclosure.

Hereinafter, the individual operation of each of elements (at least one resistor 530, 580, and 590, MOSFETs 510, 520, 540, 560, and 570, and a switch 550) will be described with reference to FIG. 6 illustrating the electronic device 410 connected with the power supply device 420.

FIG. 6 is a circuit diagram of the electronic device and the power supply device, according to various embodiments of the present disclosure.

Referring to FIG. 6, the electronic device 410 may include a processor 610, a battery 620 (hereinafter, referred to as a first battery 620), a power selection device 630, and a charging circuit 640. In addition, the electronic device 410 may include at least one element (e.g., a resistor 660, an MOSFET 680, an MOSFET 690, and a switch 550) interposed between any one of the processor 610, the first battery 620, the power selection device 420, and the charging circuit 640, and the first to seventh connection pins 431 to 437

The processor 610 may be implemented with an SoC, and may include one of a central processing unit (CPU), a graphic processing unit (GPU), an image signal processor, an application processor (AP), or a communication processor (CP) or more. The processor 610 may process a command or data received from at least one of other element by loading the command or the data from the memory and may store various pieces of data in the memory.

The memory may store data, for example, instructions for operations performed in the processor 610. In this case, the data stored in the memory may include data input and output between elements inside the electronic device 410 and may include data input and output between the electronic device 410 and elements (e.g., the power supply device 420) outside the electronic device 410.

The memory may include an internal memory or an external memory. For example, the internal memory may include, for example, at least one of a volatile memory (e.g., a dynamic RAM (DRAM), a static RAM (SRAM), or a synchronous DRAM (SDRAM)), a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like)), a hard disk drive (HDD), or a solid state drive (SSD).

The external memory may further include, for example, a flash drive such as a compact flash (CF), a secure digital (SD), a micro secure digital (Micro-SD), a mini secure digital (Mini-SD), an extreme digital (xD), a multimedia card (MMC), or a memory stick. The external memory may be operatively and/or physically connected with the electronic device 410 through various interfaces.

FIG. 6 illustrates the connection state between the electronic device 410 and the power supply device 420 through the connector 430, for example, the first to seventh connection pins 431 to 437.

When the power supply device 420 is attached to the electronic device 410, the processor 610 may receive, from the first connection pin 431, a signal for determining whether the power supply device 420 is connected.

In addition, the processor 610 may select power to be used based on signals received through the second connection pin 432, the third connection pin 433, and a signal line 650. For example, the processor 610 may determine, based on the signal received through the second connection pin 432, whether the second battery 422 is connected with the first MOSFET 510 and the second MOSFET 520. The processor 610 may determine, based on the signal received through the third connection pin 433, whether the DC power source is connected with the DC power connector 424. In addition, the processor 610 may determine whether the first battery 620 is connected, based on a signal received from the first battery 620 through the signal line 650.

The processor 610 may select any one of the first battery 620, the second battery 422, and the DC power source as a power source for supplying power to the electronic device 410 based on the signals received through the second connection pin 432, the third connection pin 433, and the signal line 650.

According to various embodiments of the present disclosure, the processor 610 may select power when a signal is maintained for a specific time while neglecting a glitch component of each of the signals received through the second connection pin 432, the third connection pin 433, and the signal line 650.

The processor 610 transmits a power selection signal to a power selection device 630 such that the power selection device 630 opens or closes any one of a path (e.g., MOSFET 680) of transmitting power from the first battery 620 and a path (e.g., MOSFET 690) of transmitting power from the second battery 422 or closes both of the MOSFET 680 and the MOSFET 690.

When the power selection device 630 opens the MOSFET 680 and closes the MOSFET 690, the electronic device 410 may use power received from the first battery 620. When the power selection device 630 closes the MOSFET 680 and opens the MOSFET 690, the electronic device 410 may use power received from the second battery 422. When the power selection device 630 closes both of the MOSFET 680 and the MOSFET 690, the electronic device 410 may use power received from the DC power sourced.

Hereinafter, an operation of transmitting power from the second battery 422 and the DC power source to the electronic device 410 will be described.

When the power supply device 420 is connected with the electronic device 410, the resistor 660 in an open state is connected with the fourth connection pin 434. Before the resistor 660 is connected with the fourth connection pin 434, the gate voltages of the MOSFET 510 and the MOSFET 520 are equal to the source voltages of the MOSFET 510 and the MOSFET 520 (the voltages across both terminals of the resistor 530 are 0 (V)) and thus the MOSFET 510 and the MOSFET 520 are in an OFF state. When the resistor 660 is connected with the fourth connection pin 434, the source voltages of the MOSFET 510 and the MOSFET 520 are increased to be much greater than the gate voltages of the MOSFET 510 and the MOSFET 520 and thus the MOSFET 510 and the MOSFET 520 may be in an ON state. In other words, the resistor 660 may be a device serving as a trigger for transmitting the power of the second battery 422 to the electronic device 410. The above description corresponds to only that the second battery 422 has power. If the second battery 422 has no power, the MOSFET 510 and the MOSFET 520 may be maintained in the OFF state.

The power of the second battery 422 may be transmitted to the electronic device 410 via the fifth connection pin 435 through the MOSFET 510 and the MOSFET 520 switched to the ON state.

Before the DC power source is connected with the DC power connector 424, the MOSFET 540 may be in the OFF state and the processor 610 may receive a high signal through the third connection pin 433. When the DC power source is connected with the DC power connector 424, the MOSFET 540 may become in the ON state and the processor 610 may receive a low signal through the third connection pin 433. In this regard, the processor 610 may determine that the DC power source is connected with the DC power connector 424.

The processor 610 may transmit a control signal for turning on the switch 550 to the switch 550 after receiving the low signal. When the switch 550 is turned on, the MOSFET 560 and the MOSFET 570 may be turned on. For example, the voltage of the DC power source is divided by the resistor 580 and the resistor 590. Accordingly, the source voltage of the MOSFET 570 is increased to be higher than the gate voltage of the MOSFET 570 and thus the MOSFET 570 may become in the ON state. In addition, when the switch 550 is turned on, the source voltage of the MOSFET 560 is increased to be higher than the gate voltage of the MOSFET 560 and thus the MOSFET 560 may become in the ON state.

The power from the DC power source may be transmitted to the electronic device 410 via the seventh connection pin 437 through the MOSFET 560 and the MOSFET 570 which are turned on.

When the power supply device 420 is detached from the electronic device 410, the source voltages of the MOSFET 510 and the MOSFET 520 are equal to the gage voltages of the MOSFET 510 and the MOSFET 520 and thus the MOSFET 510 and the MOSFET 520 are turned off. In addition, when the power supply device 420 is detached from the electronic device 410, the MOSFET 540 and the switch 550 are turned off and thus the MOSFET 560 and MOSFET 570 may be turned off.

Accordingly, even if the power supply device 420 is detached from the electronic device 410 in the state that the DC power source is connected with the DC power connector 424, the MOSFET 510, the MOSFET 520, the MOSFET 560, and the MOSFET 570 are turned off. Therefore, even if a conductive object or specific higher power is applied to the connector 430 (the first to seventh connection pins 431 to 437), the power supply device 420 may be protected.

The charging circuit 640 may charge the first battery 620 with power. In this case, a charging cable has to be connected to the electronic device 410 such that the charging circuit 640 charges the first battery 620 with power. A bus voltage VBUS applied from the charging cable may charge the first battery 620.

When the power supply device 420 is connected with the electronic device 410, the charging circuit 640 may charge the second battery 422 with power. According to various embodiments of the present disclosure, the charging circuit 640 may secondarily charge the second battery 422 with power after fully charging the first battery 620 with power.

Figure 7:
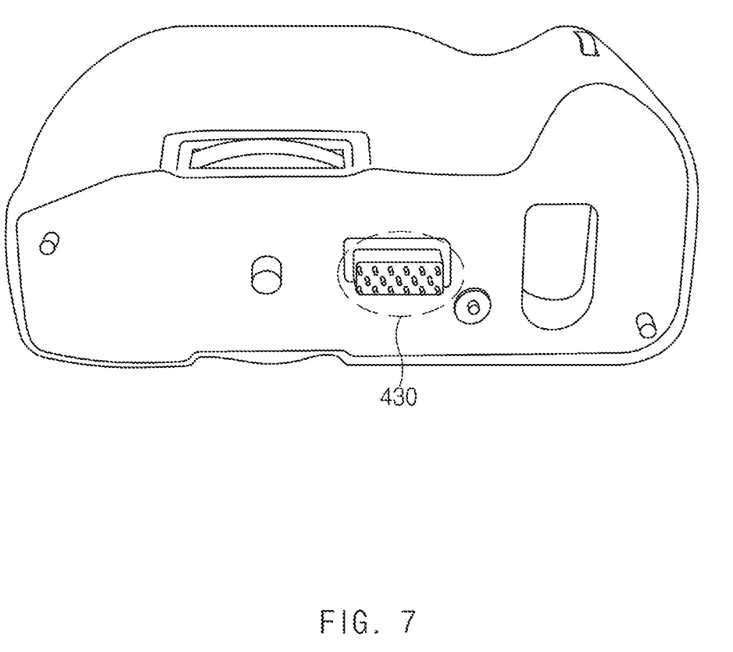
FIG. 7 is a view illustrating a connector of a power supply device, according to various embodiments of the present disclosure.

FIG. 7 is a view illustrating the connector of the power supply device, according to various embodiments of the present disclosure.

FIG. 7 is a view illustrating the detached power supply device 420. Referring to FIG. 7, the connector 430 may be positioned at one side of the power supply device 420. The connector 430 may be inserted into a receiving structure provided in the electronic device 410 and corresponding to the connector 430.

Since the connector 430 protrudes out, a conductive object (e.g., the finger of a user or a metallic material) may easily make contact with the connector 430 in the state that the power supply device 420 is detached from the electronic device 410. Accordingly, in the state that the power supply device 420 is detached from the electronic device 410, the MOSFET 510, the MOSFET 520, the MOSFET 560, and the MOSFET 570, which are interposed between the second battery 422 or the DC power connector 424 and the connector 430, may be turned off.

Figure 8:
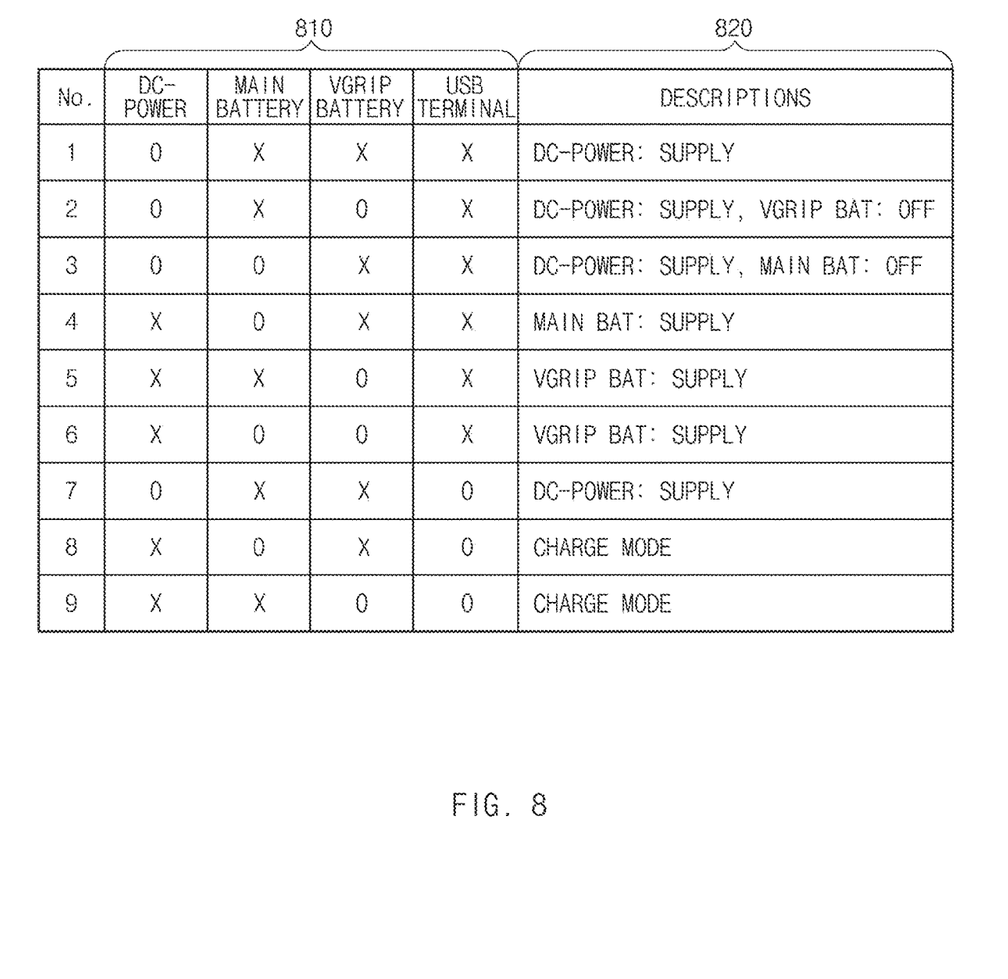
FIG. 8 is a view illustrating a power supply sequence of the electronic device and a battery charging scenario, according to various embodiments of the present disclosure.

FIG. 8 is a view illustrating a power supply sequence of the electronic device and a battery charging scenario, according to various embodiments of the present disclosure.

In the table illustrated in FIG. 8, the DC power source is expressed as "DC-POWER", the first battery 620 is expressed as "MAIN BATTERY", the second battery 422 is expressed as "VGRIP BATTERY", and the charging cable is expressed as "USB TERMINAL".

Referring to FIG. 8, 1) when the DC power source is connected with the DC power connector 424, the first battery 620 and the second battery 422 (e.g., VGRIP BATTERY) have no remaining power, and the charging cable is not connected, the DC power may be supplied as the power of the electronic device 410. 2) When the DC power source is connected with the DC power connector 424, the second battery 422 has remaining power, the first battery 620 has no remaining power, and the charging cable is not connected, the DC power may be supplied as the power of the electronic device 410. In this case, the second battery 422, which is turned off, is not available. 3) When the DC power source is connected with the DC power connector 424, the first battery 620 has remaining power, the second battery 422 has no remaining power, and the charging cable is not connected, the DC power may be supplied as the power of the electronic device 410. In this case, the first battery 620, which is turned off, is not available. 4) When the first battery 620 has remaining power, the DC power source is not connected with the DC power connector 424, the second battery 422 (e.g., VGRIP BATTERY) has no remaining power, and the charging cable is not connected, the first battery 620 may be supplied as the power of the electronic device 410. 5) When the second battery 422 has remaining power, the DC power source is not connected with the DC power connector 424, the first battery 620 has no remaining power, and the charging cable is not connected, the second battery 422 may be supplied as the power of the electronic device 410. 6) When the first battery 620 and the second battery 422 have remaining power, the DC power source is not connected with the DC power connector 424, and the charging cable is not connected, the second battery 422 may be supplied as power of the electronic device 410. Unlike the first battery 620, since the second battery 422 may be connected with or disconnected from the electronic device 410 depending on the attaching or detaching of the power supply device 420 from or to the electronic device 410, the second battery 422 may be first used to preserve the power of the first battery 620 which is always available. However, according to various embodiments of the present disclosure, when both the first battery 620 and the second battery 422 are connected, the first battery 620 may be first used. 7) When the DC power source is connected with the DC power connector 424, the charging cable is connected, and the first battery 620 and the second battery 422 have no remaining power, the DC power may be supplied as the power of the electronic device 410. In this case, the charging circuit 640 may sequentially charge the first battery 620 and the second battery 422 with power. 8) When the first battery 620 has remaining power, the charging cable is connected, the DC power is not connected with the DC power connector 424, and the second battery 422 has no remaining power, the entrance into the charging mode may be made. 9) When the second battery 422 has remaining power, the charging cable is connected, the DC power is not connected with the DC power connector 424, and the first battery 620 has no remaining power, the entrance into the charging mode may be made.

Although scenarios 1) to 9) illustrated in FIG. 8 are provided according to various embodiments of the present disclosure, the present disclosure is not limited thereto.

According to various embodiments of the present disclosure, an electronic device may include a first battery to supply power; a power supply device being detachable and including a second battery to supply power and a DC power connector; and a processor connected with the first battery and connected with the second battery and the DC power connector in connection of the power supply device. The power supply device may include at least two MOSFETs connecting the second battery with a power supply trigger device, which is provided in the electronic device, in the connection of the power supply device.

According to various embodiments of the present disclosure, the second battery may supply power to the electronic device through the at least two MOSFETs.

According to various embodiments of the present disclosure, the processor may turn on a switch included in the power supply device such that DC power is supplied to the electronic device when the DC power is applied to the DC power connector.

According to various embodiments of the present disclosure, the processor may determine whether the DC power is applied through an MOSFET connected with the DC power connector.

According to various embodiments of the present disclosure, the power supply device may include at least two MOSFETs connecting the DC power connector with the electronic device in the connection of the power supply device, and the DC power may be supplied to the electronic device through at least one MOSFET connecting the DC power connector with the electronic device, when the switch is turned on.

According to various embodiments of the present disclosure, the electronic device may further include a power selecting device to allow one of the first battery, the second battery, and the DC power connector to supply power to the electronic device.

According to various embodiments of the present disclosure, the power selection device may turn on/off at least one of a line for supplying the power of the first battery to the electronic device and a line of supplying the power of the second battery to the electronic device.

According to various embodiments of the present disclosure, the processor may supply the power to the electronic device by the DC power, the second battery, and the first battery in order of the DC power, the second battery, and the first battery.

According to various embodiments of the present disclosure, the electronic device may further include a charging circuit. The charging circuit may charge the first battery and/or the second battery with power.

According to various embodiments of the present disclosure, a power supply device may include a battery to supply power; a DC power connector to supply DC power; and a connector to connect the battery or the DC power connector with an electronic device. The battery may include at least two MOSFETs connecting the battery with a power supply trigger device included in the electronic device.

According to various embodiments of the present disclosure, the battery may supply the power to the electronic device through the at least two MOSFETs.

According to various embodiments of the present disclosure, a control signal may be received from the electronic device to turn on a switch included in the power supply device such that the DC power is supplied to the electronic device, when the DC power is applied to the DC connector.

According to various embodiments of the present disclosure, the power supply device may further include at least two MOSFETs connecting the DC power connector with the electronic device in connection of the power supply device. The DC power may be supplied to the electronic device through at least one MOSFET connecting the DC power connector with the electronic device, when the switch is turned on.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A system including an electronic device and a power supply device, wherein the electronic device comprises:
   a first battery;
   a processor; and
   a resistor,
   wherein the power supply device comprises:
      a second battery;
      a connector exposed to outside when the power supply device is detached from the electronic device;
      a DC power connector;
      a first group of MOSFETs interposed between the connector and the second battery;
      a second group of MOSFETs interposed between the connector and the DC power connector; and
      a switch interposed between the connector and the DC power connector,
   wherein when the power supply device is attached to the electronic device and the resistor is connected to the first group of MOSFETs, the first group of MOSFETs are switched to an ON state,
   wherein when a DC power source is connected with the DC power connector, the processor is configured to transmit a control signal for turning on the switch such that the second group of MOSFETs are turned on in response to the turning on of the switch, and
   wherein when the power supply device is detached to the electronic device, the first group of MOSFETs, the second group of MOSFETs, and the switch are turned off.

2. The system of claim 1, wherein the power supply device is configured to supply power from the second battery to the electronic device through the first group of MOSFETs.

3. The system of claim 1, wherein the processor is configured to determine that the DC power source is connected with the DC power connector when receiving a low signal as a third MOSFET is turned on.

4. The system of claim 1, wherein the electronic device further comprises a power selection device configured to allow one of the first battery, the second battery, and the DC power connector to supply power to the electronic device, and
   wherein the processor transmits a power selection signal to the power selection device such that the power selection device selectively opens or closes any one of a first path of transmitting power from the first battery and a second path of transmitting power from the second battery.

5. The system of claim 1,
   wherein a DC power is supplied to the electronic device through the second group of MOSFETs when the switch is turned on.

6. The system of claim 4, wherein the power selection device is configured to turn on/off at least one of a fourth MOSFET included in the first path and a fifth MOSFET included in the second path.

7. The system of claim 1, wherein the processor is further configured to:
supply power to the electronic device firstly by the DC power, secondly by the second battery, and thirdly by the first battery.

8. The system of claim 1, wherein the electronic device further comprises:
a charging circuit configured to charge the first battery and/or the second battery.

* * * * *